Inventor
R. G. Mauritzen

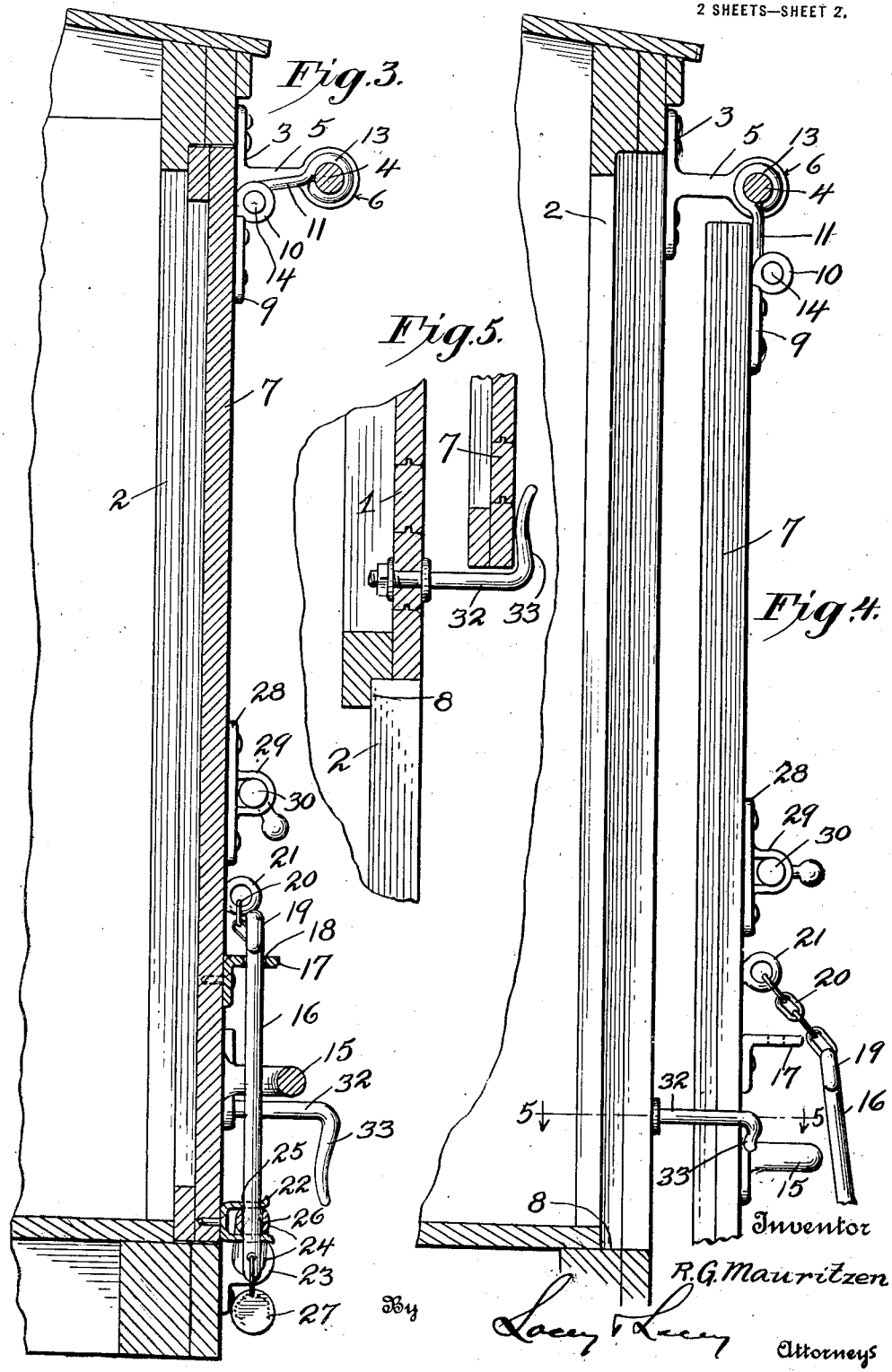

UNITED STATES PATENT OFFICE.

ROBERT G. MAURITZEN, OF SHREVEPORT, LOUISIANA.

CAR-DOOR.

1,355,495.  Specification of Letters Patent.  Patented Oct. 12, 1920.

Application filed September 14, 1918. Serial No. 254,037.

*To all whom it may concern:*

Be it known that I, ROBERT G. MAURITZEN, a citizen of the United States, residing at Shreveport, in the parish of Caddo and State of Louisiana, have invented certain new and useful Improvements in Car-Doors, of which the following is a specification.

This invention seeks to provide a car door which may be easily manipulated and which may be securely and quickly locked in closed position and which, when in closed position, will entirely fill the door opening so that the contents of the car cannot escape.

The invention is illustrated in the accompanying drawings, in which—

Fig. 3 is a vertical section on the line 3—3 of Fig. 1 showing the door in closed position;

Fig. 4 is a view similar to Fig. 3 but showing the door in open position;

Fig. 5 is an enlarged detail horizontal section on the line 5—5 of Fig. 4.

Figure 1:
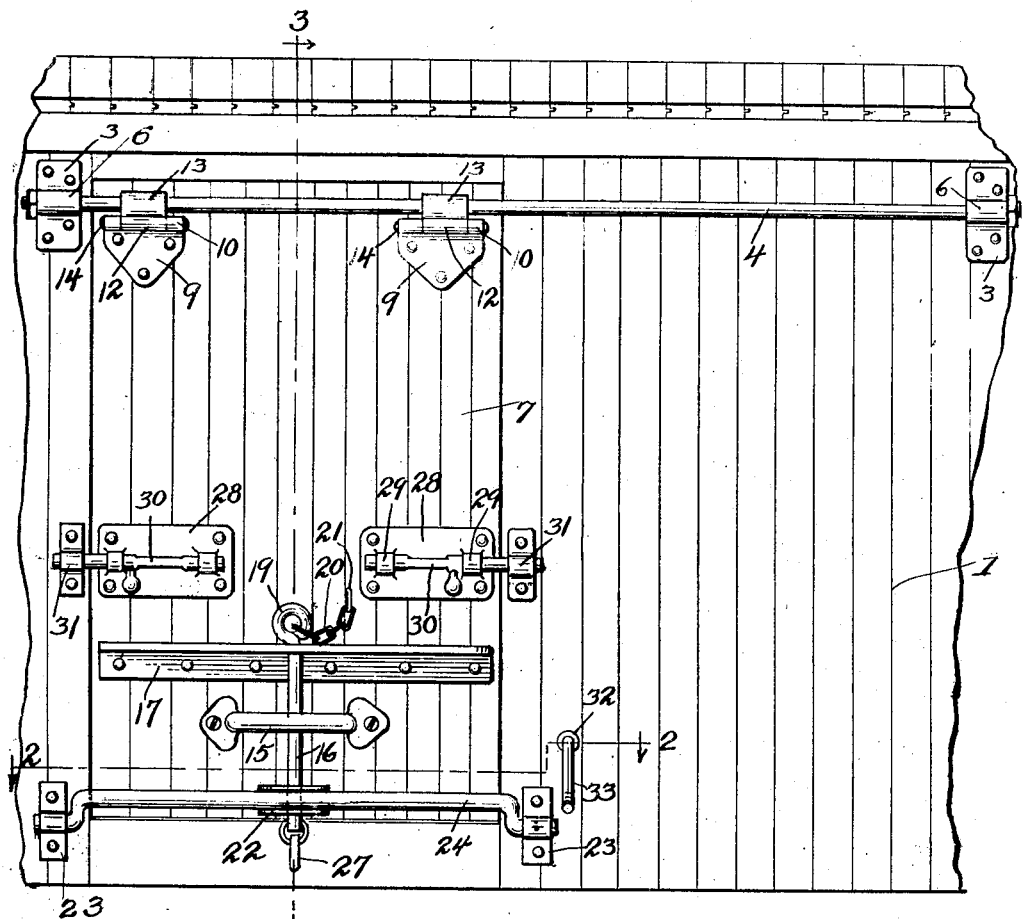
Figure 1 is an elevation of my improved car door in closed position.
Figure 2:
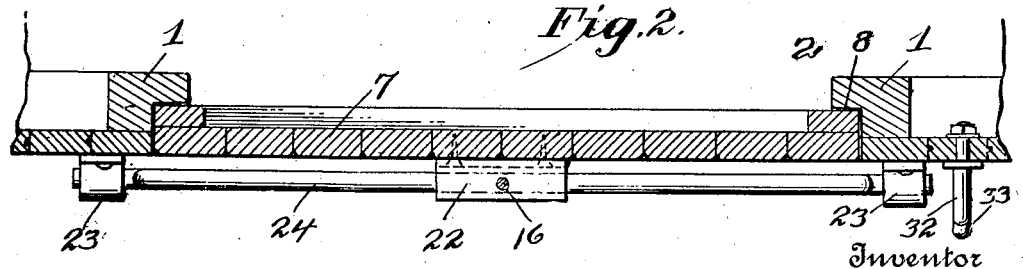
Fig. 2 is a horizontal section on the line 2—2 of Fig. 1.

The car body 1 may be of the usual freight car construction and is provided with a door opening 2 in its side as will be readily understood. Upon the outer side of the car and beyond the sides of the door opening, I secure brackets 3 in which are secured the ends of a rod or track bar 4, the brackets 3 being constructed with outwardly projecting horizontal arms 5 having loops or eyes 6 at their outer extremities to receive the ends of said track rod which may be secured in said eyes in any convenient or preferred manner. The door 7 is constructed of boards in the usual manner and of such dimensions that it will fit closely within the door opening 2 and against the shoulders 8 formed around the sides of said opening. Upon the outer side of the door, near the upper end thereof, I secure brackets 9 having pintle ears 10 at their upper edges between which is received the lower end of a hanger 11. Each hanger 11 consists of a metallic strap having an eye 12 at its lower end to fit between the pintle ears 10 on the adjacent bracket 9 and provided at its upper end with an eye 13 to pivotally engage the track rod 4, as shown. A pintle 14 is inserted through the pintle ears 10 and 12 so as to pivotally attach the door to the hangers and the eyes or loops 13 should be long enough to furnish substantial supports for the door and of such diameter that they may slide readily upon the track rod 4.

Near the lower end of the door on the outer side thereof, I provide a handle 15 which may be of any desired form but is preferably a loop secured at its ends to the door and having its intermediate portion spaced from the door so that the sealing pin 16 may pass through the loop between the door and the body of the loop, as shown clearly in Fig. 3. Above the handle 15, an angle bar 17 is secured upon the outer side of the door and this angle bar furnishes an effectual brace for the door, while its outstanding horizontal flange is provided with an opening 18 through which the sealing pin is inserted and whereby the head 19 of the sealing pin may rest upon said flange and the pin be thereby supported. To guard against loss of the pin, a short chain or other flexible connection 20 is secured to the head of the pin and to an eye 21 on the door, as shown, and as will be readily understood. At or near the lower extremity of the door, I provide a bracket or stop rest 22 in the form of a short length of channel iron and upon the side of the car adjacent the lower end of the door opening and at the opposite sides of the same I secure brackets 23 in which is rotatably mounted a bail or locking bar 24. This bail is adapted to be swung upwardly so that its intermediate portion will pass through and fit in the channel bar bracket 22 and openings 25 and 26 are formed in the said bracket and the bail, respectively, to receive the lower portion of the sealing pin 16, as shown most clearly in Fig. 3, the lower end of the sealing pin being constructed in any convenient or preferred manner to carry a seal, indicated at 27.

Upon the outer side of the door and adjacent each edge of the same, I secure a plate 28 having guides 29 thereon in which is slidably mounted a bolt 30 adapted to engage a keeper 31 secured on the side of the car, as shown. I also secure on the side of the car a spring arm 32 having its outer end 33 turned at a right angle and having its inner end rotatably fitted in the car body.

When the door is in closed position, the bolts 30 engaging the keepers 31 will effectually hold the door in the door opening. The movement of the door out of or away from the door opening is, furthermore, effectually resisted by the hangers 11 which, as shown in Fig. 3, extend almost horizontally between the track rod 4 and the door and thereby serve as braces to hold the door within the door opening while the lower end of the door is held against outward movement by the engagement of the locking bail 24 within the bracket 22 and the insertion of the sealing pin through the said bracket and the bail. To open the door, the seal is broken and the sealing pin may then be lifted so as to be withdrawn from the locking bail 24 and the bracket 22. The bail is then swung downwardly so that it will lie below the lower edge of the door, after which an outward and downward pull is exerted upon the lower end of the door through the handle 15, the door moving pivotally about the pintles 14 and then swinging about the track rod 4 to the position shown in Fig. 4. The door may then be slid along the track rod 4 until it has passed beyond the spring latch 32, whereupon said latch may be turned so that its outer hooked end will engage against the outer side of the door, as shown in Fig. 4 and thereby prevent the door being accidentally pushed across the door opening while the car is being unloaded. To close the door, the latch 32 is released, the door then slid to a position in front of the door opening, and an upward and inward push exerted upon the door so that its upper end will be engaged in the door opening after which the door will be readily swung into closed position.

My improved car door is simple in construction and efficient in operation. It may be produced and applied to a car at a low cost and will obviate the use of nails, spikes or similar means for holding the door against accidental opening so that the door may be used a long time under normal conditions without showing any material wear or damage.

Having thus described my invention, what is claimed as new is:

1. The combination of a car body, a car door mounted thereon, a locking bracket secured horizontally on the car door and having an open outer side, a locking bail rotatably mounted in fixed bearings upon the car body in position to extend across the door and engage in said bracket through the open outer side thereof, and a sealing pin mounted upon the car door above said bracket and adapted to pass vertically through the bracket and through that portion of the bail lying within the bracket.

2. The combination of a car body having a door opening, a door adapted to fit within said opening, a channel bracket secured horizontally upon the outer side of the door, a bail rotatably fitted at its ends in fixed bearings upon the car body at the sides of the door opening to swing into or out of engagement with said channel bracket through the outer side of the same, a brace secured upon the car door above the said bracket, a loop secured on the door between the brace and the bracket for moving the door to open or closed position, and a sealing pin supported by and passing through said brace and adapted to pass between the loop and the door and through the said bracket and through the portion of the locking bail lying within the bracket and receive a seal below the bracket and the bail.

In testimony whereof I affix my signature.

ROBERT G. MAURITZEN. [L. S.]